J. C. SCHOTT.
POULTRY FEEDER.
APPLICATION FILED MAR. 6, 1912.
1,058,796.
Patented Apr. 15, 1913.
2 SHEETS—SHEET 1.
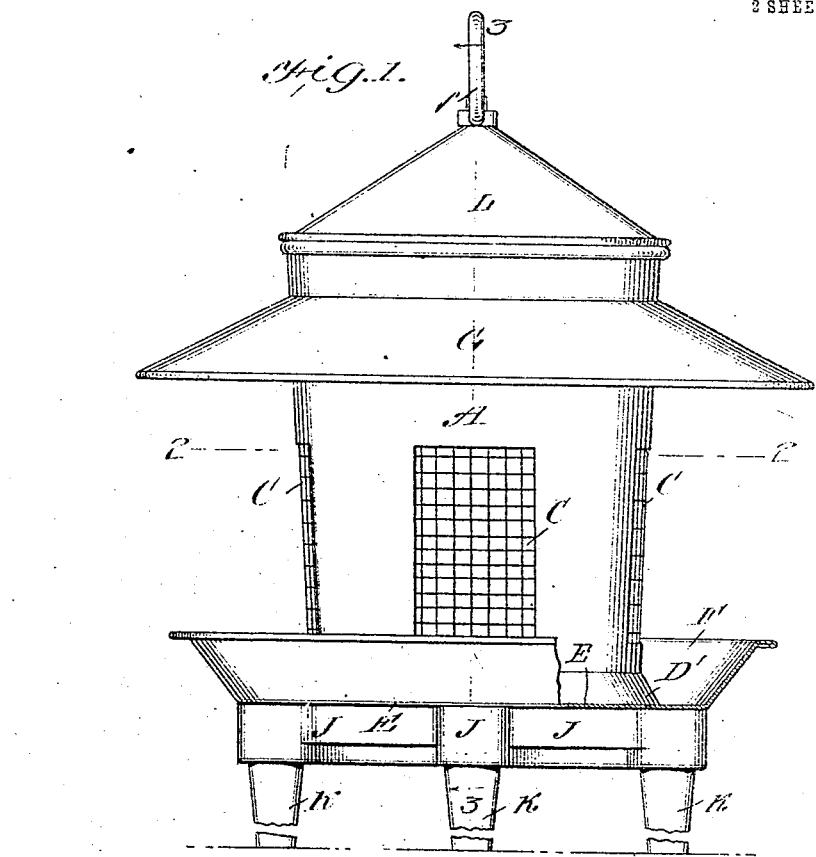
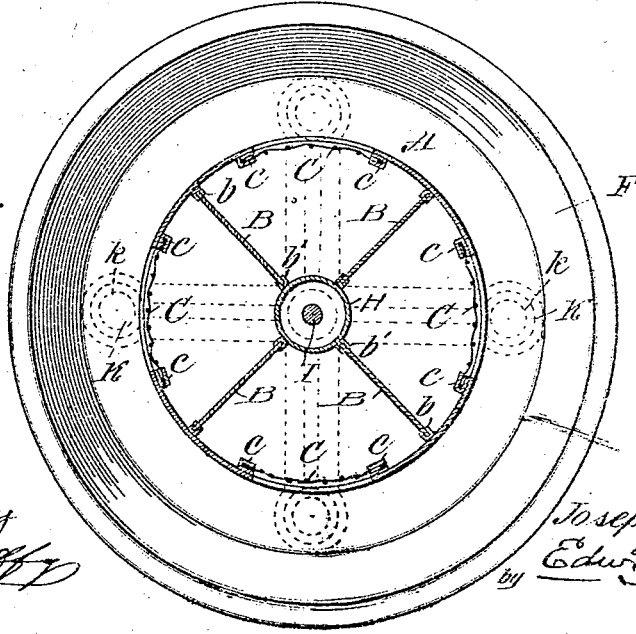
WITNESSES
INVENTOR
Joseph C. Schott
by Edw. W. Byrn
Attorney

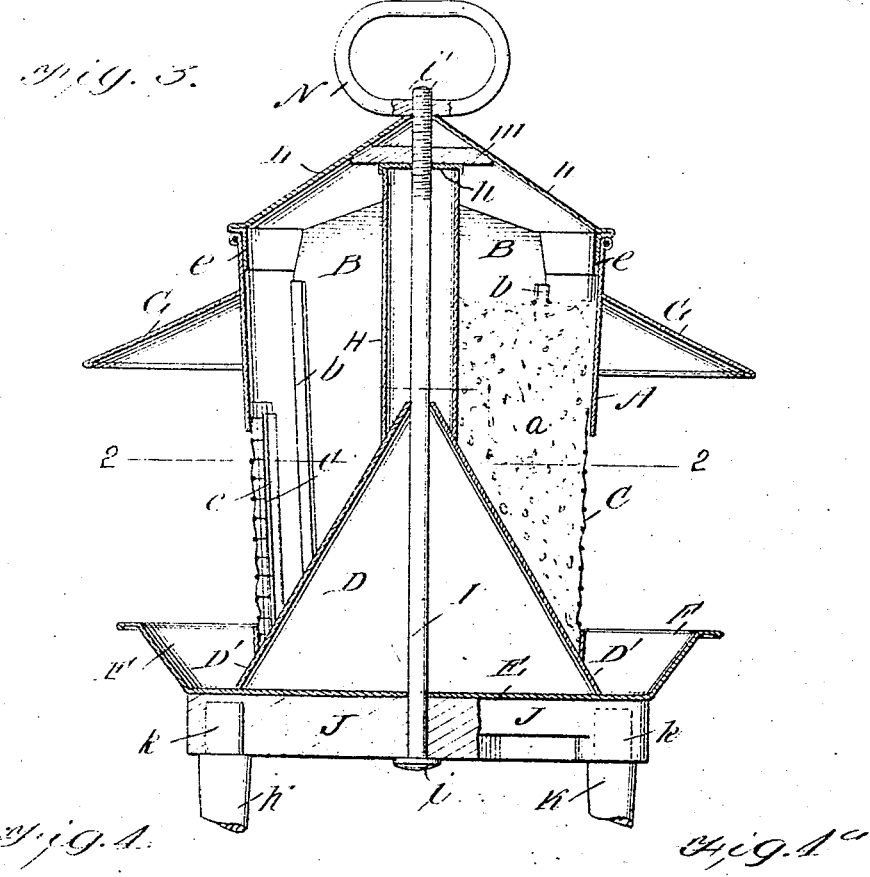

UNITED STATES PATENT OFFICE.

JOSEPH C. SCHOTT, OF CHICORA, PENNSYLVANIA.

POULTRY-FEEDER.

1,058,796.  Specification of Letters Patent.  Patented Apr. 15, 1913.

Application filed March 6, 1912. Serial No. 681,969.

*To all whom it may concern:*

Be it known that I, JOSEPH C. SCHOTT, a citizen of the United States, residing at Chicora, in the county of Butler and State of Pennsylvania, have invented certain new and useful Improvements in Poultry-Feeders, of which the following is a specification.

My invention is an improvement upon that form of poultry feeder in which a hopper or reservoir for the feed is provided with a conical bottom and an annular trough around the bottom into which the feed is allowed to gravitate, a little at a time, through openings at the bottom part of the hopper, and it consists in the novel construction and arrangement of parts operating upon this principle and possessing great advantages of simplicity, cheapness, ease of construction, accommodating a variety of different kinds of feed at the same time and protecting it from the weather and from mice and rats and from spilling in case of being upset, as will be hereinafter more fully described with reference to the drawings in which, Figure 1 is a side elevation, partly in section. Fig. 2 is a horizontal section on line 2—2 of Fig. 3. Fig. 3 is a vertical central section and, Figs. 4 and 4ª are details of slight modifications of the screen through which the feed is allowed to fall into the trough.

Similar letters of reference indicate the same parts in all the views.

In the drawing A represents the outer casing of the hopper, circular in horizontal section and largest at the top, so that the side walls hang outwardly at the top. This casing is provided with a conical bottom D whose upper end connects permanently with a central vertical tube H, and the lower end of which conical bottom extends at $D^r$ outside of the circumference of the lower part of the outer casing, E is a separate detachable base plate of dish-shaped sheet metal which extends outside of the lower edge of the conical bottom and forms an annular trough F running all around the hopper below the feed receptacle. This dish-shaped base plate is detachably held to the conical bottom of the feed hopper by a vertical central rod I and a cast metal frame J of radial arms having a central hub portion through which the lower end of rod I passes and which rod below said frame has an enlarged head $i$. At the top the rod I is screw threaded at $i^1$ and passes through a cover cap $h$ for the central tube H and also through a screw threaded hole in a cross bar $m$ which extends diametrically across the top of the tube H. Above this cross bar the screw threaded end of the rod I extends centrally through a conical cover L whose depending flange $e$ at its outer edge fits snugly within the upper edge of the outer casing A. Above the conical cover L the screw threaded end of rod I has screwed upon it the screw threaded hole of a handle loop N which, when turned tightly down, holds the cover L down so that it cannot accidentally come off to spill the contents even if the feed hopper is upset. The rod I, it will be seen, clamps the subjacent frame J and base pan E to the bottom of the feed hopper and also holds the feed hopper down by the cross bar $m$ and also holds the cover L down closed by the loop handle N. This loop handle performs the double function of clamping down the cover and also forming a handle for transporting the device and for hanging it up when it is desired to suspend the same. It will be seen, also, that the outer ends of the radial arms of the metal frame J extend out to the outer edge of the bottom of the pan, so as to keep the latter from buckling or bending down, and also to form a widely separated connection for supporting legs, hereafter described.

In the outer wall of the casing near the bottom are arranged, around the same, a plurality of openings each of which is provided with a screen or grating C of woven wire or other open work of slatted, perforated or reticulated form. These openings and screens stop short of the bottom of the hopper and overhang outwardly at their upper ends in the plane of the side wall, so that the feed material $a$ within may drop through the screen into the subjacent trough F whenever said feed material is jarred or its equilibrium is disturbed. These screens are made of different size of mesh, as seen in Figs. 4 and 4ª, to permit different kinds of feed to pass through the same and said screens are interchangeable and adjustable by means of vertical guide ways $cc$ along the sides of the openings in the wall of the casing into which any one of the screens may be inserted or removed and replaced by another.

The body portion of the hopper is subdivided into compartments by means of vertical partitions B arranged radially, as shown in Fig. 2, and these several compartments are adapted to receive different kinds of feed, the screens at the bottoms of these compartments being selected and inserted to correspond with the sizes and character of said different kinds of food. These partitions B, however, are made detachable and may be removed to throw two or more compartments into one, or remove them altogether, and for this purpose vertical guide ways $b$ are formed on, or attached to, the inner sides of the outer casing and other guide ways $b^1$ are formed on, or attached to, the central tube H to lie in the same plane as guide ways $b$ and into which guide ways the partitions B may be slid and from which they may be removed.

To the upper portion of the outer casing of the feed hopper below the cover and independent of the same there is rigidly attached a circular canopy flange G which extends a distance outwardly sufficient to overhang and protect the trough F from rain and falling dirt.

To permit the feed device to be supported on the ground without being fouled by dirt, the ends of the cast metal radial arms J are formed with sockets $k$ to receive the tenons of four legs K which may be removed when the device is hung up.

In the operation of my poultry feeder, the fowls see the feed through the wire screens and, pecking at it, jar the same so as to cause a small quantity to fall through the screen to the outside into the trough F where it is subsequently picked up by them. The openings closed by the screens do not extend quite to the bottom of the hopper so that there is no communication from the hopper to the trough F except through the screen and as the screen hangs outwardly at the top, the feed readily sifts through it in limited quantities whenever jarred by the pecking of the fowls.

My feed hopper will be manufactured from galvanized iron in different sizes, from small chick size up to a size holding from one to two bushels of feed. All the sheet metal parts are pressed and the lower frame or stand is cast and when the parts are all locked together by the central rod it is as tight and secure as if all were soldered together. The screens are made of a size of mesh to permit the passage of grain, beef scrap, ground bone, charcoal, grit and oyster shell.

My hopper is very sanitary, as no dirt, dust, rain or any foreign substance can get into the feed, nor can rats or mice get into it to soil or destroy the feed. It is also an economical feeder as the chickens cannot waste or destroy the food by scratching it out upon the floor or ground. The device is automatic in action and needs no attention after once being filled. It also prevents the fowls from gorging themselves too fast, as only a limited amount of food can be taken at a time and they have to work for that. The device may be used either indoors or out of doors. If used indoors, it may be hung from the ceiling or side wall, or set upon the floor, or be placed between or in partitions of different pens of birds, so that each can eat from the same hopper without intermingling. It may also be made half round so as to better adapt it to lie flat against a wall if hung thereagainst.

In defining my invention more clearly, I would state that I am aware that it is not new to provide feeding devices for live stock in which a feed hopper has an inclined bottom and openings on the side through which the feed passes through gratings into a subjacent and outwardly extending trough and I do not claim this broadly.

The arrangement of the gratings C substantially in the plane of the sides of the conical hopper-shaped receptacle A not only permits the easy insertion or removal of the interchangeable gratings in the guides $c$ $c$ from the top, but as this feed hopper is made with said side walls overhanging outwardly at the top, said gratings when jarred by the pecking of the fowls allow the contents to fall outwardly in limited quantity into the subjacent trough without waste. Furthermore, by connecting the rod I to the frame J with radial arms the pan E is held stiffly and strongly up to the conical bottom D and hopper A without solder with a cheap detachable knock down construction, the pan E being separate from the conical bottom and hopper and held thereto by cross bar $m$, while cover L is retained by handle N. The sockets of the pan J and detachable legs also allow the device to either be supported from below or suspended from above and at the same time impart stiffness to the whole construction.

I claim.

1. A poultry feeder comprising a hopper largest at the top with conical bottom and outlet feed openings in its side provided with gratings arranged substantially in the plane of the overhanging sides of the hopper, a subjacent dish-shaped pan extending beyond the conical bottom of the feed hopper and made separate therefrom, a frame of radial arms below the pan, a central headed rod with head below the frame and a screw threaded upper end, a cover for the hopper perforated to receive the rod and a nut screwed upon the upper end of the rod and binding the cover, hopper, and subjacent pan tightly together, the outer ends of the radial arms of the lower frame being formed with sockets and detachable legs seated in said sockets.

2. A poultry feeder, comprising a hopper circular in cross section and largest at the top and having grated openings near the lower end of the side walls, a conical bottom for said hopper having the apex of the cone extended in the form of a vertical tube, a subjacent pan extending beyond the conical bottom to form a trough, a radial frame work below the pan, a clamping rod extending through the frame, conical bottom and tube and screw threaded at its upper end, a cross piece having a screw threaded hole turned upon the upper part of the rod and bearing on the edges of the tube, a cover for the hopper and a second screw threaded fastening device turned on the rod above the cover.

3. A poultry feeder, comprising a conical bottom a hopper formed by side walls circular in horizontal section, and made largest at the top, said side walls being rigidly connected to the conical bottom above its lower edge and provided with openings whose bottoms are located above the lower edge of said side walls, gratings for said openings, a detachable pan fitting against the conical bottom, a frame work beneath the pan and a rod binding said detachable pan to the conical bottom and upper part of the hopper.

4. A poultry feeder, comprising a hopper circular in cross section and having a conical bottom and having openings in its sides, above the conical bottom, provided with gratings, a subjacent pan below the conical bottom, a frame below the pan, an upright rod extending through the frame and conical bottom, a central tube surrounding said rod, means for securing the rod to the top of the tube, vertical guide ways fixed to the central tube and the inside of the hopper walls, and detachable partitions arranged in said guides.

5. A poultry feeder, comprising a hopper with conical bottom, a subjacent sheet metal pan, a frame with radial arms in contact with the bottom of the pan and extending out to the outer edge of the pan and a rod binding the said frame to the hopper.

6. A poultry feeder, comprising a hopper with conical bottom, a subjacent sheet metal pan a frame with radial arms in contact with the bottom of the pan and extending out to the outer edge of the pan and having sockets on their lower sides at the outer ends, a rod binding the said frame to the hopper and detachable legs inserted in the sockets at the outer ends of the radial arms.

7. A poultry feeder, comprising a hopper with conical bottom, a detachable sheet metal subjacent pan, a rigid frame member below the pan and in contact with the same, a binding rod extending through the same, a cover for the hopper and two connections for the upper end of the rod, one of which holds the rod to the hopper and the other of which holds the rod to the cover.

In testimony whereof I affix my signature in presence of two witnesses.

JOSEPH C. SCHOTT.

Witnesses:
JOHN MURRIN,
JOSEPH DARLING.